United States Patent
Gonzalez Alemany et al.

(10) Patent No.: US 9,828,218 B2
(45) Date of Patent: Nov. 28, 2017

(54) TRANSPORT SYSTEM FOR THE MOVEMENT OF PASSENGERS

(71) Applicant: THYSSENKRUPP ELEVATOR INNOVATION CENTER S.A., Gijon (ES)

(72) Inventors: Miguel Angel Gonzalez Alemany, Oviedo (ES); Juan Domingo Gonzalez Pantiga, Gijon (ES); Pedro Ros Zuazua, Oviedo (ES); Alberto Florez Castro, Lugo de Llanera (ES); Francisco Palomero Cocho, Gijon (ES); Aurelio Castaño Lantero, Langreo (ES); Luis Joaquín Fernandez Alvarez, Gijon (ES)

(73) Assignee: THYSSENKRUPP ELEVATOR INNOVATION CENTER S.A., Gijon (ES)

( * ) Notice: Subject to any disclaimer, the term of this patent is extended or adjusted under 35 U.S.C. 154(b) by 0 days.

(21) Appl. No.: 15/024,259

(22) PCT Filed: Aug. 19, 2014

(86) PCT No.: PCT/ES2014/070661
§ 371 (c)(1),
(2) Date: Mar. 24, 2016

(87) PCT Pub. No.: WO2015/044480
PCT Pub. Date: Apr. 2, 2015

(65) Prior Publication Data
US 2016/0236910 A1 Aug. 18, 2016

(30) Foreign Application Priority Data
Sep. 25, 2013 (ES) .................................. 201331393

(51) Int. Cl.
*B66B 23/10* (2006.01)
*B65G 17/34* (2006.01)
(Continued)

(52) U.S. Cl.
CPC ............ *B66B 23/10* (2013.01); *B65G 17/066* (2013.01); *B65G 17/34* (2013.01); *B65G 21/22* (2013.01);
(Continued)

(58) Field of Classification Search
CPC ......... B66B 21/12; B66B 23/10; B66B 23/12; B66B 23/145; B65G 17/066; B65G 17/34; B65G 21/22; B65G 54/02
(Continued)

(56) References Cited

U.S. PATENT DOCUMENTS 3,395,648 A 8/1968 Karr et al.
3,516,363 A 6/1970 Van Der Wal
(Continued)

FOREIGN PATENT DOCUMENTS

EP 1253101 A1 10/2002
EP 1939128 A2 7/2008
(Continued)

OTHER PUBLICATIONS

English Translation of International Search Report for PCT/ES2014/070661 dated Nov. 27, 2014 (dated Dec. 5, 2014).
(Continued)

*Primary Examiner* — Gerald McClain
*Assistant Examiner* — Keith R Campbell
(74) *Attorney, Agent, or Firm* — thyssenkrupp North America, Inc.

(57) ABSTRACT

A set of pallets for transportation systems for transporting passengers and/or goods may include a pulling pallet that pulls a pulled pallet. The pulled and pulling pallets may
(Continued)

articulate relative to one another about an axis substantially perpendicular to a direction of displacement of a continuous belt formed by such sets of pallets. The set of pallets may have a support surface for supporting passengers and/or goods, as well as a functional surface opposite the support surface. The functional surface may include a balance having a first end articulated to the functional surface according to an axis substantially perpendicular to the direction of displacement and a second end opposite the first end that has a one or more coupling devices that form a coupling joint between one or more devices that pull the pulling pallet along a trajectory followed by the continuous belt.

20 Claims, 4 Drawing Sheets

(51) Int. Cl.
| | | |
|---|---|---|
| B65G 54/02 | (2006.01) | |
| B65G 17/06 | (2006.01) | |
| B65G 21/22 | (2006.01) | |
| B66B 21/12 | (2006.01) | |
| B66B 23/12 | (2006.01) | |

(52) U.S. Cl.
CPC .............. *B65G 54/02* (2013.01); *B66B 21/12* (2013.01); *B66B 23/12* (2013.01)

(58) Field of Classification Search
USPC .......................................................... 198/334
See application file for complete search history.

(56) References Cited

U.S. PATENT DOCUMENTS

| | | | |
|---|---|---|---|
| 3,583,543 A | | 6/1971 | Angioletti et al. |
| 3,939,959 A | | 2/1976 | Dunstan et al. |
| 4,197,933 A | * | 4/1980 | Dunstan ................. B66B 23/02 104/290 |
| 4,276,976 A | * | 7/1981 | Dunstan ................. B66B 21/12 198/334 |
| 4,602,567 A | | 7/1986 | Hedstroem |
| 4,730,717 A | | 3/1988 | Sugita |
| 4,841,869 A | * | 6/1989 | Takeuchi ................ B60L 13/04 104/140 |
| 5,020,654 A | * | 6/1991 | Sansevero ............... B66B 21/06 198/328 |
| 5,295,568 A | * | 3/1994 | Saito ....................... B66B 23/02 198/330 |
| 6,138,816 A | | 10/2000 | Sato et al. |
| 7,997,400 B2 | * | 8/2011 | Gonzalez Alemany ................................. B66B 21/12 198/330 |

FOREIGN PATENT DOCUMENTS

| | | |
|---|---|---|
| ES | 2179720 A1 | 1/2003 |
| ES | 2277796 A1 | 7/2007 |
| ES | 2289955 A1 | 2/2008 |
| ES | 2400373 A1 | 4/2013 |
| ES | 2401206 A1 | 4/2013 |
| GB | 1383785 A | 2/1974 |
| GB | 2300168 A | 10/1996 |
| JP | H02231389 A | 9/1990 |

OTHER PUBLICATIONS

Priority Search Document, Oficina Española de Patentes y Marcas (dated Apr. 4, 2014).
English Abstract of ES2289955A1.

* cited by examiner

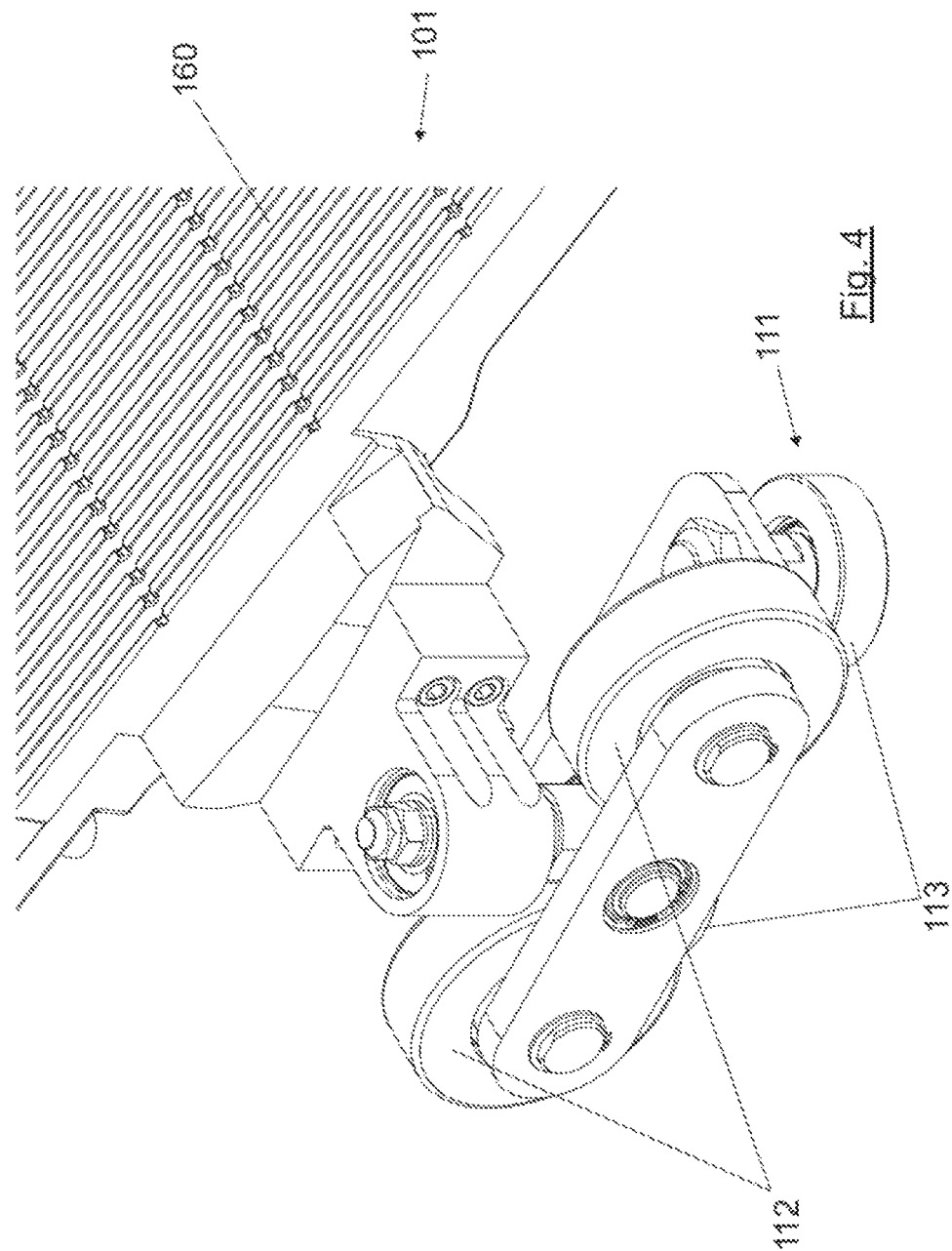

TRANSPORT SYSTEM FOR THE MOVEMENT OF PASSENGERS

CROSS REFERENCE TO RELATED APPLICATIONS

This application is a U.S. National Stage Entry of International Patent Application Serial Number PCT/ES2014/070661, filed Aug. 19, 2014, which claims priority to Spanish Patent Application No. ES P201331393 filed Sep. 25, 2013, the entire contents of both of which are incorporated herein by reference.

FIELD

The present disclosure relates to transportation systems used to transport passengers or goods and, more particularly, to pallets for such transportation systems that have different stretches operating at different speeds.

BACKGROUND

It is common to come across mechanical walkways wherein various stretches that operate at different speeds are defined, in such a way that, according to the direction in which the same is operating, a first boarding area is established in the walkway, which moves slowly, alongside an acceleration area, an intermediate maximum speed area, a deceleration area and a slow speed disembarking area.

Various Solutions exist to achieve variable speed required in the acceleration and deceleration areas, including that proposed in ES2289955. Document U.S. Pat. No. 3,939,959 reveals an acceleration walkway, in which each palette, in addition to overlapping the previous palette, is provided with a pair of wheels. These wheels have a horizontal rotation axis and are not capable of adapting to a curved stretch when necessary, for example in order to carry out a horizontal turn. The way the set operates is therefore unsuitable.

BRIEF DESCRIPTION OF THE FIGURES

FIG. 4 is an enlarged view of an example bogie for a set of pallets for a transportation system.

DETAILED DESCRIPTION

Figure 1:
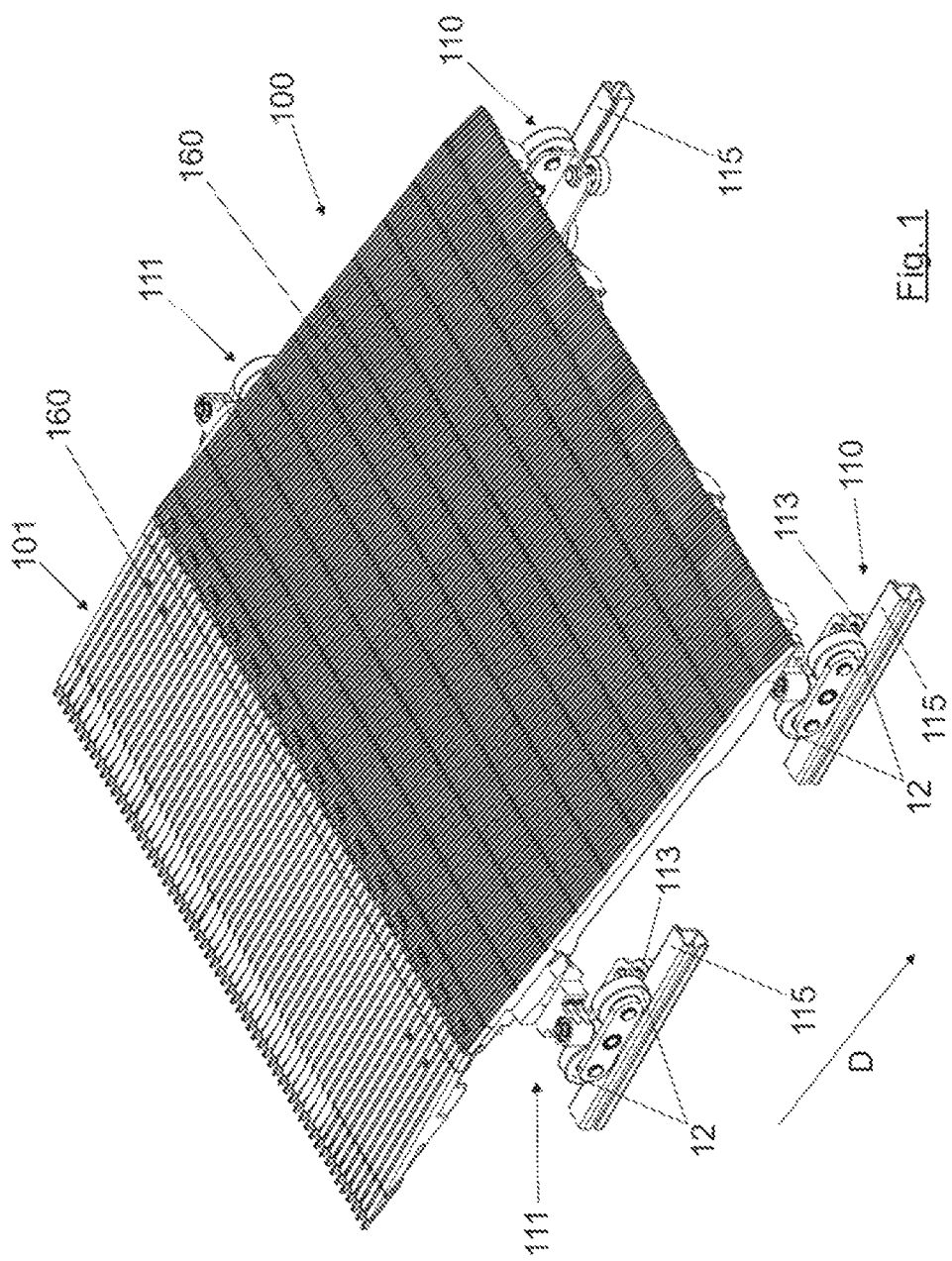
FIG. 1 is a perspective view of an example set of pallets for a transportation system.
Figure 2:
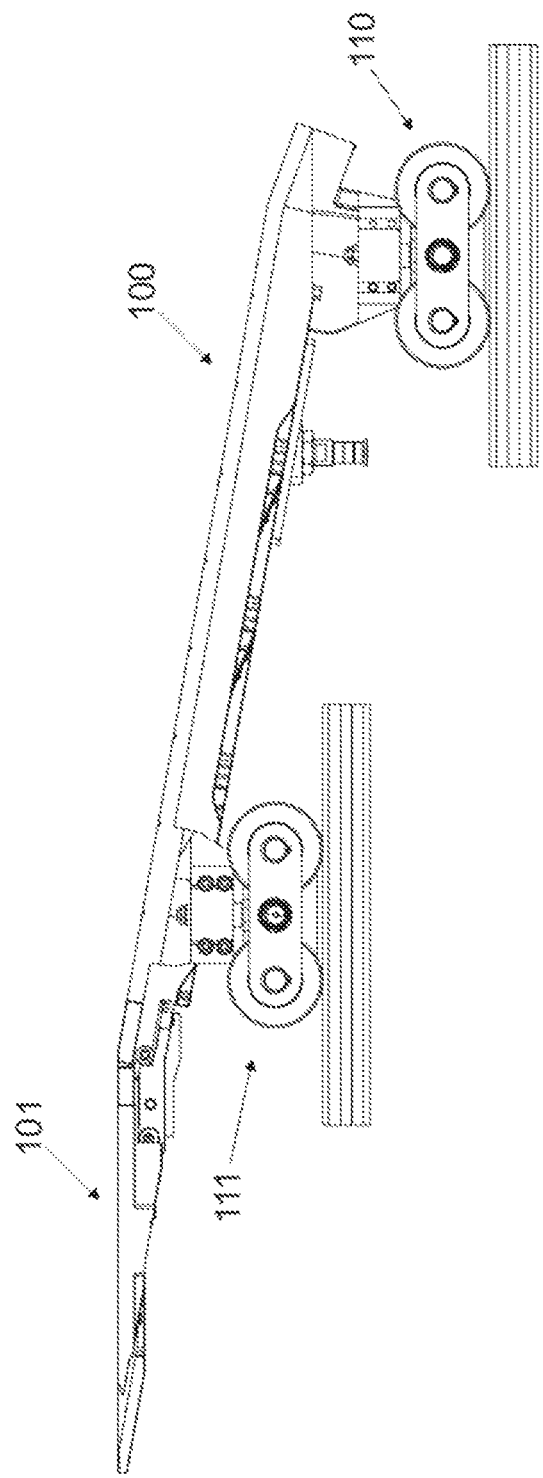
FIG. 2 is a side view of an example set of pallets for a transportation system.
Figure 3:
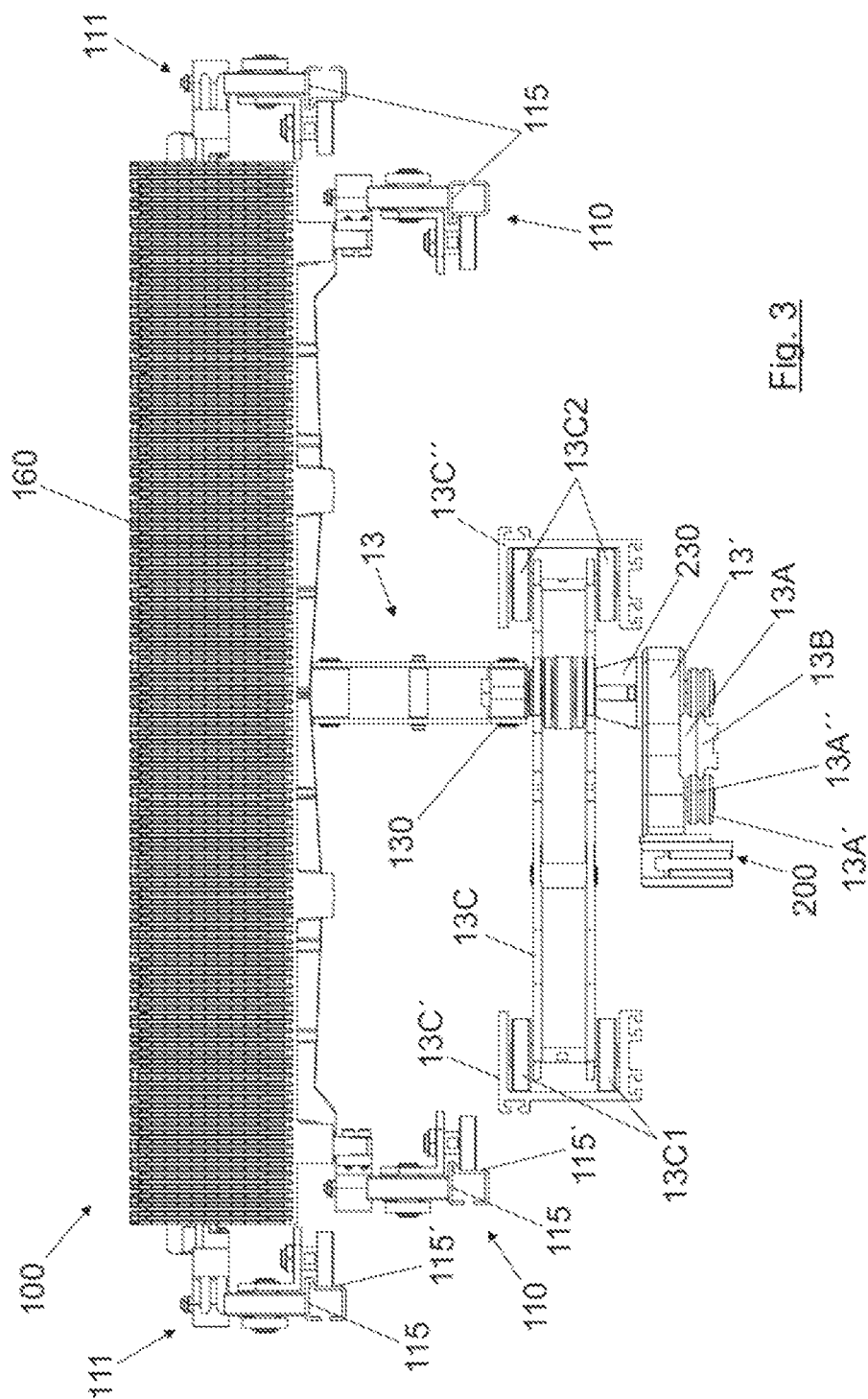
FIG. 3 is a front view of an example set of pallets for a transportation system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

The present disclosure concerns sets of pallets for transportation systems for transporting passengers and/or goods. Many of the example sets of pallets are configured for use with systems having low speed stretches located in boarding/disembarking areas, high speed stretches located in middle areas, and transition speed stretches located between the boarding/disembarking areas and the middle areas. The present disclosure may thus be used in mechanical walkways of the variety used in, for example and without limitation, airports, bus stations, train stations, large buildings, and all other types of buildings in which such displacement is desired or where users must travel relatively lengthy stretches.

Therefore, the present disclosure proposes a set of palettes for a transportation system, where the palette pulling elements operate more simply than in the state of the art closest to the invention. In turn, the examples of the present disclosure avoid or at least minimize use of various pulling elements, which are highly mechanically complex, to provide stretches with different speed profiles, i.e. low speed in the boarding and disembarkment areas, high speed in the central area and corresponding transition areas between the high and low speed areas.

This arrangement facilitates greater modularity upon making it possible to choose and replace any of the system components more flexibly, given that each speed area in the system is treated as a sub-set.

Another advantage of the transportation system that incorporates the set of palettes of the present invention is that, since more traditional components than those used in the closest state of the art are used, it is much less complicated to manufacture, thereby meaning both the initial cost of the system and the cost of replacing any of the components thereof is considerably lower.

This greater mechanical simplicity also means that the system components last longer; they undergo much less wear, which results in said components having a longer useful life, which in turn means the system will operate for longer between rest periods used for maintenance and makes it more reliable.

The invention relates to a set of palettes for a transportation system used to move passengers/goods, like that defined in the set of claims, i.e. a set of palettes for a transportation system used to move passengers and/or goods, formed by a continuous movable belt, based on said sets of palettes. Each set has a support surface, designed to support the passengers and/or goods and has a variable transportation length between a boarding and disembarking point.

This transportation length is variable. The set of pallets has a pulled palette, which is pulled by a pulling palette, both palettes being articulated to one another according to an axis perpendicular to a displacement direction D of the belt.

In addition, the palettes have a functional surface opposite to the support surface, which has a balance, which in turn has a first end articulated to the functional surface according to a horizontal axis and a second end opposite to the first end, which has first coupling means.

These first coupling means are designed to articulate according to a horizontal axis to second coupling means connected to the pulling means of the continuous belt, so that the pulling palettes are pulled by the pulling means, thus pulling said belt of pallets in the direction of displacement D.

The second coupling means are connected to the pulling means by means of a guide cart designed to travel in a direction defined by a pulling guide parallel to the direction of displacement running along the length of the belt trajectory.

According to specific embodiments of the invention, this guide cart has at least one internal pulley wheel with a vertical rotation axis, designed to go around an internal face of the pulling guide and, at least one external pulley wheel with a vertical rotation axis designed to go around an external face of the pulling guide.

Furthermore, the balance may have articulations on its ends, designed to rotate relative to axes parallel to a middle longitudinal plane of the belt, it being possible for these rotational axes to be perpendicular to the support surface.

According to preferred embodiments of the invention, the pulling palette may have a first pair of bogies, arranged one at each side of said pulling palette, in a frontal area of the same and, a second pair of bogies, also arranged one at each side of the pulling palette but in this case, in a rear area of the same.

These bogies are designed to travel in directions defined by support tracks, which run along the length of the belt trajectory.

The pairs of bogies may be located on planes at varying distances from a surface of the palette.

According to specific embodiments of the invention, the second coupling means have an articulation with a chain link designed to be rotated relative to a vertical axis, at a level lower to the support surface.

In this regard, the chain link may be bent and have a first pair of chain pulley wheels with a vertical rotation axis, on a first end of the bent link, designed to go around a first chain guide and a second pair of chain pulley wheels with a vertical rotation axis, on a second end of the bent link, designed to go around a second chain guide.

In addition, the pulling palette specifically has a plurality of grooves, whilst the pulled palette has a plurality of first teeth, designed to be coupled into these grooves in the pulling palette (100), located in the adjacent palette set, thus guiding a sliding movement between the pulling palette and the pulled palette in said adjacent palette set (100, 101).

According to a particular embodiment of the invention, the pulling means have a linear motor aligned with the direction of displacement D.

One embodiment of the invention relates to an set of palettes 100, 101 for a transportation system used to transport passengers/goods, formed by a continuous belt that can travel based on said sets of palettes 100, 101, where each set has a support surface 160, designed to support passengers/goods and to have a variable transportation length between a boarding and disembarking point. Variable transportation length refers to the fact that the length of the set of palettes 100, 101 may vary between a minimum length, where there is a maximum overlap between sets and a maximum length, where there is a minimum overlap between sets. In the transportation system trajectory, there is a low speed stretch, located in a boarding/disembarking area of the continuous belt, a high speed stretch, located in a middle area of the continuous belt and a transition speed stretch, located between the boarding/disembarking area and the middle area of the continuous belt. The maximum overlap or minimum length is used in the low speed stretch, i.e. in the boarding/disembarking stretch, whilst the minimum overlap or maximum length is used in the high speed stretch, i.e. the middle area of the continuous belt. In the transition speed stretch located between the boarding/disembarking area and the middle area, an intermediate overlap is used, thus meaning the transportation length is also intermediate.

Each set is formed by a pulled palette 101, which is pulled by a pulling palette 100, both palettes 100, 101 being articulated to one another according to an axis perpendicular to a displacement direction D of the belt.

Furthermore, the palettes 100, 101 comprise a functional surface opposite to the support surface 160, which has a balance 13, which in turn has a first end articulated to the functional surface according to an axis perpendicular to the direction of displacement D and a second end opposite to the first end, which has first coupling means 130, in order to couple pulling means 200 of the continuous belt and the pulling palette 100 together.

The first coupling means 130 are designed to interact with second coupling means 230 of the pulling means 200 of the continuous belt, so that the pulling palettes 100 are pulled by the pulling means 200 by means of a coupling join between the first coupling means 130 and the second coupling means 230 and to pull said belt of palettes 100, 101 in the direction of displacement D.

The pulling means 200 furthermore have a linear motor aligned with the direction of displacement D.

As regards other characteristics of the invention:

According to a specific embodiment of the invention, the balance 13 comprises a guide cart 13' on the second end, designed to travel in a direction defined by a pulling guide 13A, 13B, parallel to the direction of displacement D, which runs along the length of the belt trajectory.

Furthermore, the guide cart 13' may have at least one inner pulley wheel 13A", which has a vertical rotation axis designed to go around an internal face of the pulling guide 13A and at least one external pulley wheel 13A', which has a vertical rotation axis designed to go around an external face of the pulling guide (13A).

The balance 13 specifically has an arm designed to travel on a plane perpendicular to the support surface 160, this plane perpendicular to the support surface 160 preferably being arranged on a middle longitudinal plane, parallel to the direction of displacement D.

According to a preferred embodiment of the invention, the pulling palette 100 has a first pair of bogies 110, one at each side of the pulling palette 100, arranged in a frontal area of said pulling palette 100 and a second pair of bogies 111, one at each side of the pulling palette 100, arranged in a rear area of said pulling palette 100.

These bogies are designed to travel in directions defined by support tracks 115 parallel to the direction of displacement D, which run along the length of the belt trajectory. The first pair of bogies 110 and the second pair of bogies 11 are particularly located on planes at varying distances from the palette surface 100 and the first pair of bogies 110 preferably defines a first width that coincides with the width of the pulling palette 100, whilst the second pair of bogies 111 defines a second width, which is wider than that of the pulling palette 100.

According to a particular embodiment of the invention, each pair of bogies 110, 111 has a pair of vertical pulley wheels 112 with a horizontal rotation axis, designed to go around support tracks 115 parallel to the direction of displacement D, which run along the length of the belt trajectory. The tracks 115 are designed to support the weight of the continuous belt.

Each pair of bogies 110, 111 may have a pair of horizontal pulley wheels 113 with a vertical rotation axis, designed to go around a number of side guides 115'. The side guides 115' and the tracks 115 define the plan trajectory of the continuous belt. In addition, the pulley wheels 112, 113, which are both vertical and horizontal, pertaining to the bogies, may be placed in positions symmetrical to a middle longitudinal plane of the belt.

The balance 13 preferably has a chain link 13C on its second end, designed to travel on a plane parallel to the support surface 160, at a level lower than said support surface 160.

This chain link 13C is bent and has a first pair of chain pulley wheels 13C1, which have a vertical rotation axis, on a first end of the bent chain, designed to go around a first chain guide 13C' and a second pair of chain pulley wheels 13C2, which have a vertical rotation axis, on a second end of the bent chain, designed to go around a second chain guide 13C".

According to a specific embodiment of the invention, the pulling palette (100) comprises a plurality of grooves and the pulled palette (101) comprises a plurality of teeth designed to be coupled with the first teeth and to guide a sliding movement between the pulling palette (100) and the pulled palette (101).

A palette selected from the pulling palette 100, the pulled palette 101 and combinations thereof preferably comprises inserts to indicate a demarcation between the palettes to a user. Having described the invention clearly, it must be noted that the details of the specific embodiments described above may be amended, provided that these amendments do not alter the fundamental principle and essence of the invention.

What is claimed is:

1. A set of pallets for use in a continuous belt for a transportation system for transporting passengers and/or goods, the set of pallets comprising:
   a support surface configured to support passengers and/or goods, the support surface having a variable transportation length between a boarding point and a disembarking point;
   a pulled pallet;
   a pulling pallet for pulling the pulled pallet, wherein the pulled pallet and the pulling pallet are articulated relative to one another according to an axis substantially perpendicular to a direction of displacement of the continuous belt, wherein at least a portion of the support surface is defined by the pulled pallet and the pulling pallet, wherein the pulling pallet comprises:
      a functional surface opposite the support surface,
      a balance having a first end and a second end opposite the first end, with the first end being articulated relative to the functional surface according to a substantially horizontal axis,
      a first coupling means disposed at the second end of the balance,
      a second coupling means, wherein the first coupling means is configured to articulate relative to the second coupling means about a substantially horizontal axis, with the second coupling means being connected to a pulling means of the continuous belt such that the pulling pallet is pulled by the pulling means, which pulls the continuous belt in the direction of displacement, and
      a guide cart that connects the second coupling means to the pulling means, with the guide cart being movable in a direction defined by a pulling guide and that is substantially parallel to the direction of displacement running along a length of a trajectory of the continuous belt, wherein the guide cart comprises an internal pulley wheel having a substantially vertical rotation axis and configured to engage with an internal face of the pulling guide, the guide cart further comprising an external pulley wheel having a substantially vertical rotation axis and configured to engage with an external face of the pulling guide.

2. The set of pallets of claim 1 wherein the pulling pallet comprises:
   a first pair of bogies, one disposed at each side of the pulling pallet in a frontal area of the pulling pallet; and
   a second pair of bogies, one disposed at each side of the pulling pallet in a rear area of the pulling pallet,
   wherein the first and second pair of bogies are configured to travel in directions defined by support tracks disposed along the length of the trajectory of the continuous belt.

3. The set of pallets of claim 2 wherein the first and second pairs of bogies are positioned on planes at varying distances from a surface of the pulling pallet.

4. The set of pallets of claim 2 wherein a first width separating the first pair of bogies is smaller than a second width separating the second pair of bogies.

5. The set of pallets of claim 2 wherein each of the first and second pairs of bogies comprises a pair of substantially vertical pulley wheels having a substantially horizontal rotation axis and configured to engage with support tracks disposed along the length of the trajectory of the continuous belt.

6. The set of pallets of claim 2 wherein each of the first and second pairs of bogies comprises a pair of substantially horizontal pulley wheels having a substantially vertical rotation axis and configured to engage with side guides.

7. The set of pallets of claim 6 wherein the pairs of substantially horizontal pulley wheels of the first and second pairs of bogies are positioned symmetrically relative to a middle longitudinal plane of the continuous belt.

8. The set of pallets of claim 1 wherein the pulling pallet comprises a plurality of grooves, wherein the pulled pallet comprises a plurality of first teeth configured to be coupled into a plurality of grooves of an adjacent pulling pallet and to guide a sliding movement between the adjacent pulling pallet and the pulled pallet.

9. The set of pallets of claim 1 wherein at least one of the pulling pallet or the pulled pallet comprises inserts to indicate a demarcation between the pulling pallet and the pulled pallet.

10. The set of pallets of claim 1 wherein the pulling means comprises a linear motor aligned with the direction of displacement.

11. A set of pallets for use in a continuous belt for a transportation system for transporting passengers and/or goods, the set of pallets comprising:
    a support surface configured to support passengers and/or goods, the support surface having a variable transportation length between a boarding point and a disembarking point;
    a pulled pallet;
    a pulling pallet for pulling the pulled pallet, wherein the pulled pallet and the pulling pallet are articulated relative to one another according to an axis substantially perpendicular to a direction of displacement of the continuous belt, wherein at least a portion of the support surface is defined by the pulled pallet and the pulling pallet, wherein the pulling pallet comprises:
       a functional surface opposite the support surface,
       a balance having a first end and a second end opposite the first end, with the first end being articulated relative to the functional surface according to a substantially horizontal axis, wherein the balance comprises articulations on its ends that are configured to rotate relative to axes parallel to a middle longitudinal plane of the continuous belt,
       a first coupling means disposed at the second end of the balance,
       a second coupling means, wherein the first coupling means is configured to articulate relative to the second coupling means about a substantially horizontal axis, with the second coupling means being connected to a pulling means of the continuous belt such that the pulling pallet is pulled by the pulling means, which pulls the continuous belt in the direction of displacement, and
a guide cart that connects the second coupling means to the pulling means, with the guide cart being movable in a direction defined by a pulling guide and that is substantially parallel to the direction of displacement running along a length of a trajectory of the continuous belt.

12. The set of pallets of claim 11 wherein the axes parallel to the middle longitudinal plane of the continuous belt are perpendicular to the support surface.

13. The set of pallets of claim 11 wherein the pulling pallet comprises:
a first pair of bogies, one disposed at each side of the pulling pallet in a frontal area of the pulling pallet; and
a second pair of bogies, one disposed at each side of the pulling pallet in a rear area of the pulling pallet,
wherein the first and second pair of bogies are configured to travel in directions defined by support tracks disposed along the length of the trajectory of the continuous belt.

14. The set of pallets of claim 11 wherein the pulling pallet comprises a plurality of grooves, wherein the pulled pallet comprises a plurality of first teeth configured to be coupled into a plurality of grooves of an adjacent pulling pallet and to guide a sliding movement between the adjacent pulling pallet and the pulled pallet.

15. The set of pallets of claim 11 wherein at least one of the pulling pallet or the pulled pallet comprises inserts to indicate a demarcation between the pulling pallet and the pulled pallet.

16. The set of pallets of claim 11 wherein the pulling means comprises a linear motor aligned with the direction of displacement.

17. A set of pallets for use in a continuous belt for a transportation system for transporting passengers and/or goods, the set of pallets comprising:
a support surface configured to support passengers and/or goods, the support surface having a variable transportation length between a boarding point and a disembarking point;
a pulled pallet;
a pulling pallet for pulling the pulled pallet, wherein the pulled pallet and the pulling pallet are articulated relative to one another according to an axis substantially perpendicular to a direction of displacement of the continuous belt, wherein at least a portion of the support surface is defined by the pulled pallet and the pulling pallet, wherein the pulling pallet comprises:
a functional surface opposite the support surface,
a balance having a first end and a second end opposite the first end, with the first end being articulated relative to the functional surface according to a substantially horizontal axis,
a first coupling means disposed at the second end of the balance,
a second coupling means, wherein the first coupling means is configured to articulate relative to the second coupling means about a substantially horizontal axis, with the second coupling means being connected to a pulling means of the continuous belt such that the pulling pallet is pulled by the pulling means, which pulls the continuous belt in the direction of displacement,
a guide cart that connects the second coupling means to the pulling means, with the guide cart being movable in a direction defined by a pulling guide and that is substantially parallel to the direction of displacement running along a length of a trajectory of the continuous belt,
a first pair of bogies, one disposed at each side of the pulling pallet in a frontal area of the pulling pallet; and
a second pair of bogies, one disposed at each side of the pulling pallet in a rear area of the pulling pallet, wherein the first and second pair of bogies are configured to travel in directions defined by support tracks disposed along the length of the trajectory of the continuous belt, wherein the first pair of bogies and the second pair of bogies rotate independently relative to axes perpendicular to the support surface enabling the pulling pallet to adapt to curved trajectories in side guides and turn horizontally, wherein the first pair of bogies and the second pair of bogies rotate independently relative to substantially horizontal axes enabling the pulling pallet to adapt to curved trajectories of the support tracks.

18. A set of pallets for use in a continuous belt for a transportation system for transporting passengers and/or goods, the set of pallets comprising:
a support surface configured to support passengers and/or goods, the support surface having a variable transportation length between a boarding point and a disembarking point;
a pulled pallet;
a pulling pallet for pulling the pulled pallet, wherein the pulled pallet and the pulling pallet are articulated relative to one another according to an axis substantially perpendicular to a direction of displacement of the continuous belt, wherein at least a portion of the support surface is defined by the pulled pallet and the pulling pallet, wherein the pulling pallet comprises:
a functional surface opposite the support surface,
a balance having a first end and a second end opposite the first end, with the first end being articulated relative to the functional surface according to a substantially horizontal axis,
a first coupling means disposed at the second end of the balance,
a second coupling means, wherein the first coupling means is configured to articulate relative to the second coupling means about a substantially horizontal axis, with the second coupling means being connected to a pulling means of the continuous belt such that the pulling pallet is pulled by the pulling means, which pulls the continuous belt in the direction of displacement, wherein the second coupling means comprises an articulation to a chain link configured to be rotated relative to a substantially vertical axis at a level lower than the support surface, and
a guide cart that connects the second coupling means to the pulling means, with the guide cart being movable in a direction defined by a pulling guide and that is substantially parallel to the direction of displacement running along a length of a trajectory of the continuous belt.

19. The set of pallets of claim 18 wherein the chain link is bent in shape and comprises:
a first pair of chain pulley wheels having a substantially vertical rotation axis on a first end of the chain link, the first pair of chain pulley wheels configured to engage a first chain guide; and a second pair of chain pulley wheels that have a substantially vertical rotation axis on a second end of the chain link, the second pair of chain pulley wheels configured to engage a second chain guide.

20. The set of pallets of claim 18 wherein the pulling means comprises a linear motor aligned with the direction of displacement.

* * * * *